(No Model.) 2 Sheets—Sheet 1.
R. P. GARSED.
BUFFER.
No. 341,568. Patented May 11, 1886.
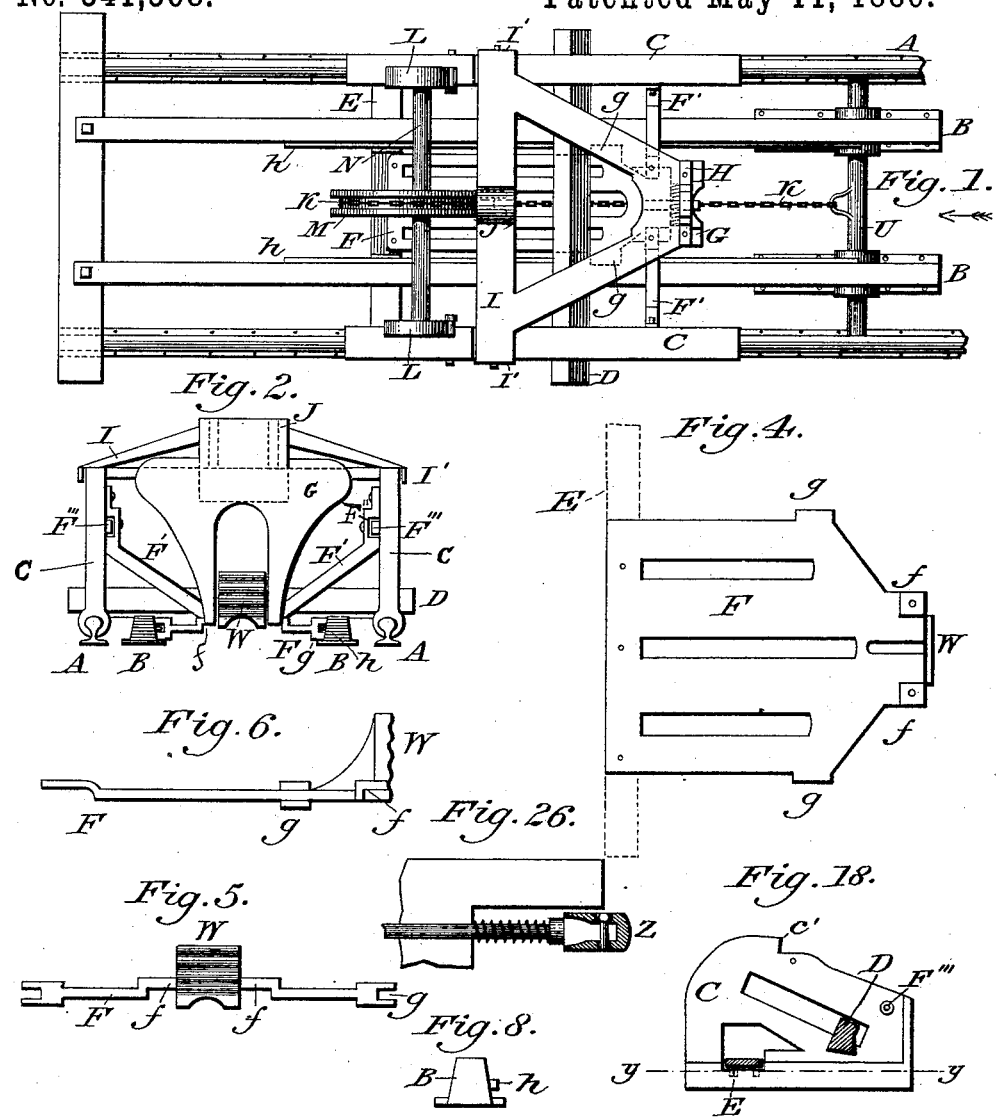

(No Model.) 2 Sheets—Sheet 2.
R. P. GARSED.
BUFFER.
No. 341,568. Patented May 11, 1886.
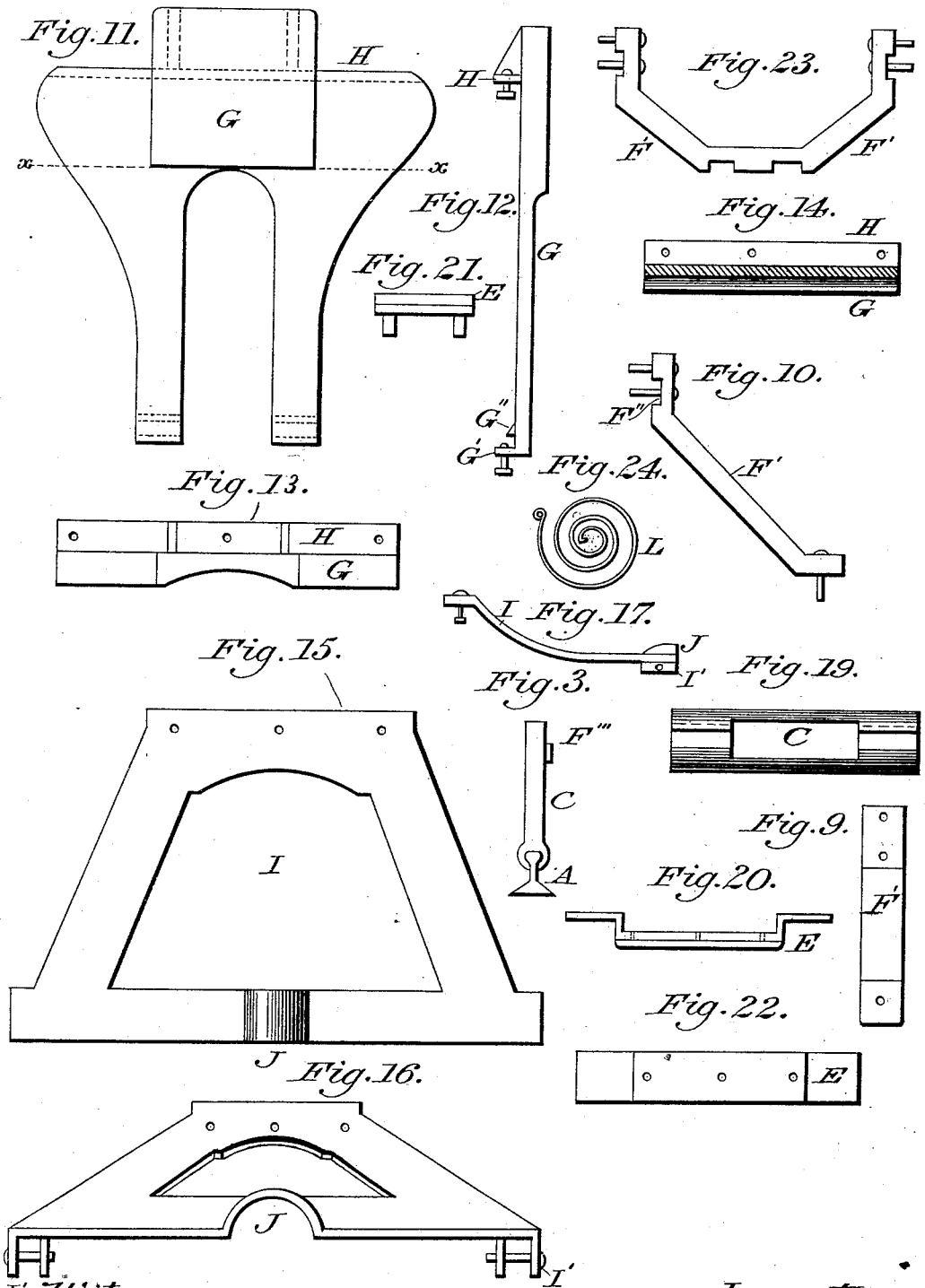

UNITED STATES PATENT OFFICE.

ROBERT P. GARSED, OF NORRISTOWN, PENNSYLVANIA.

BUFFER.

SPECIFICATION forming part of Letters Patent No. 341,568, dated May 11, 1886.

Application filed January 29, 1886. Serial No. 190,179. (No model.)

*To all whom it may concern:*

Be it known that I, ROBERT P. GARSED, a citizen of the United States, and a resident of Norristown, Montgomery county, and State of Pennsylvania, have invented a new and useful Improvement in Buffers, of which the following is a specification, and which, taken in conjunction with the drawings that accompany it, will enable others to understand it.

The object of my invention is to furnish an improved and effective buffer suitable for arresting motion in any kind of car or engine when upon terminals or sidings of railways by engaging them at their strongest parts, said invention being more particularly improvements on my Patents No. 308,069, November 18, 1884, Nos. 318,462 and 318,463, May 26, 1885, and No. 330,009, November 10, 1885; and while I know that a mere shoe or kindred device has been used upon railroad-tracks to effect the stoppage of trains, such as is set forth in English Patent No. 1,599 of 1856, and such as was designed by Mr. Jeffries, master mechanic, and used in various places upon the Reading Railroad during the last ten years, or, as Mr. Jeffries says, since 1865, yet an apparatus as I claim it, either to move or be used stationary and with its friction-producing mechanism and with elements to receive the blow of a car or engine, and while with features producing powerful friction, yet adapted to recover itself when desirable, and again with especial features to arrest the advance of any kind of car or engine, I hold it to be absolutely novel and greatly useful.

In the accompanying drawings, forming part of this specification, and in which similar letters of reference indicate like parts throughout the several views, Figure 1 represents a plan view of the device upon a track; Fig. 2, a front view; Fig. 3, a view of one of the housings, showing a boss thereon for engagement of brackets shown in Figs. 9 and 10; Fig. 4, a top view of the pilot-engager, which, when in place, is supported at its rear end by under friction-bar, E, of the apparatus; Fig. 5, a front view, and Fig. 6 a side view, of same; Fig. 7, a side view of one of the bed-bars with a rib attached to its inner side, and Fig. 8 a rear view; Fig. 9, a front view of a pilot-engager supporting-bracket, and Fig. 10 a side view; Fig. 11, a front view of the sill or car-buffer engager with its concave face for closing the knuckle, when open, of the "Janney coupler and buffer;" Fig. 12, a side view; Fig. 13, a top view, and Fig. 14 a bottom view, through line $xx$ of Fig. 11; Fig. 15, a top view of the sill or coupler engager brace; Fig. 16, a front view, and Fig. 17 a side view; Fig. 18, a side view of a housing, and Fig. 19 a top view through line $yy$ of Fig. 18; Fig. 20, a front view of under cross-bar, E; Fig. 21, an end view, and Fig. 22 a top view; Fig. 23, a modification of Figs. 9 and 10; Fig. 24, a view of one of the coil-springs L, which restores the device to its original position; Fig. 25, a top view of Fig. 7, and Fig. 26 a view of coupler with knuckle Z and sill at end of car.

A A, Figs. 1 and 2, represent the tracks of a railroad. B, Figs. 1, 2, 7, 8, and 25, are inclined-faced bed-bars resting between said rails upon the ties of the road.

C, Figs. 1, 2, 3, 18, and 19, are metal housings or shoes with clamps at their bases suited to the shape of the rails A A and adapted to be held thereby and to slide thereon.

D, Figs. 1, 2, and 18, is the upper friction-bar of the device passing over the bars B and through the housings C and moves with said housings upon their operation.

E, Figs. 1, 20, 21, and 22, is the under friction-bar, which passes beneath part of the bars B and is connected and moves with the housings, as does bar D.

F, Figs. 1, 2, 4, 5, and 6, is the "pilot-engager," which at its rear is fastened, as before mentioned, and at its front end by the brackets F', Figs. 1, 2, 9, and 10, these brackets at their upper ends having offsets F'', Fig. 10, which fit over bosses F''' on the housings C, to which they are bolted, as shown in Fig. 2. They thus better secure the parts in position upon the operation of the device. The pilot-engager, as will be seen, has openings to allow chain K to be fastened stationary in place to the staple in anchor-bar U, which fastening causes springs L to be wound up upon the advance of the housings.

G, Figs. 1, 2, 11, 12, 13, and 14, is the coupler or sill-engager, and in its proportions is made to suit either passenger, freight, lime, or coal cars, and may be attached to or taken from the device without interfering with the other parts, and in its absence the cars will be stopped by direct engagement of their wheels with the housings C, as more particularly described in my other patents referred to, though such engagement may not be preferable because of the strain upon the truck-pin of the cars, the tendency of the body of the car in such case being to advance while the wheels are held. The upper part of G has its central face concaved enough to close the knuckle Z of the Janney coupler, if left open, upon the striking of the passenger-car, which knuckle, if not closed, is often broken, the closing of said knuckle being caused by such projecting hinged body coming in contact with a slanting face. This central part of G suits as well the "Miller car buffer and coupler" without its closing property being brought into use, and its breadth lower down is such to engage the bumper-blocks of a coal-car, allowing for the space between them—as, for instance, the average height to bottom of Janney or Miller coupler from ties of road is about two feet ten inches; that to the bumpers of freight or lime cars about two feet six inches, and that to those of coal-cars about two feet five inches, the former at its greatest breadth being about thirteen inches, while the latter, with its two nine-inch-square bumper-blocks, has about fourteen inches between them, and so the central upper part of G is made broad enough for engagement in the one case, and, if not engaged lower down at its center, is not a detriment in the other. The lower part of G is bifurcated and passes on each side of the front of pilot-engager W and F, and the foot G' and the lug G'', Fig. 12, pass the former under and the latter over the parts f. (Shown in Figs. 2, 4, 5, and 6.) This secures G better in position as against either upward or downward movement, a bolt being used through foot G' and the part f, and at the same time through lower part of bracket F'. On the rear of this sill engager there is cast a ledge, H, Figs. 11, 12, 13, and 14, to which the front of "sill-engager brace" I is bolted when in place, as is seen in Fig. 1. The ears I' of this brace, while serving to keep the brace in place at its rear part upon the housings, prevent the housings from inclining outwardly or inwardly when being operated, a bolt at these parts holding the brace in position, and the shoulder c' on each housing (see Fig. 18) serving to keep the brace from moving ahead.

In Figs. 2, 4, 5, and 6 I show bifurcated projections g, integral with the sides of the pilot-engager, which fit over and under the ledge h on the bed-bars B. (Shown in Figs. 2, 7, 8, and 25.) They are used so that when the device is struck by a high blow—such as would be given by the sill of a car—the tendency of the housings to rise at this end is overcome by the fastening to sleepers of bed-bars B, and also by their downward tendency, as is the case when friction-bar D slides upon their upper surfaces.

In Fig. 19 a form of the base or clamps of a housing is shown, which, when in place, does not bear its full length beneath the top of the rail A where it presses when the device is being advanced. It is so made to save weight of metal in this element of the device, which may be done without weakening it, for a reason that the upward tendency of bar D within the slots of the housings is resisted mainly by the housings at their ends upon the rails, and so the intermediate clamping becomes unnecessary; and then, again, housings C being thus chambered are easier fitted to said rails.

The hood J upon the cross-piece of the sill-engager brace I allows room for top of chain-wheel M to pass.

The operation of the device is as follows: A train comes in the direction of the arrow, Fig. 1, and the nose of pilot or the sill, coupler, &c., of a car engages the device at the parts suited, with the effect that it moves forward upon the rails A A, and produces friction thereby, through the medium of bar D bearing upon the upper faces of bars B, which latter are stationary upon the road-bed, or between housings C C and the rails A A, and thus the train is stopped gradually and without jarring or injury to it, the distance the device moves being in accordance with the force of the blow and the resistance it offers, which resistance is in accordance with the incline of the bars B or the slots in the housings C. After retreat of the train the apparatus is moved to its first position by the operation of the coil-springs L, which at one end are fastened to the housings C and at their other to revolving shaft N, to which wheel M and chain K are fastened, the winding up of springs taking place upon the advance of the device, and their subsequent uncoiling returning the apparatus to its first position.

The incline of the bed bars B, as mentioned in my Patent No. 330,009, November 10, 1885, is one and a half inch to every foot in length, or at an angle of seven degrees, but when the apparatus is operated by other parts than by the wheels of a train, it will be necessary to alter the angle of the slots in the housings to a less incline than forty degrees, as mentioned in said patent. Even thirty-five degrees will not retard the device too much when the bearings are smooth or when the device is struck from the strongest parts of the train, and in this event the housings should be at least four feet upon the rails. Yet this increased length takes up no more room upon the road-bed when the device is operated than if it were shorter, as the ends of the housings, being but eighteen inches high, extend under the platform of the cars.

The span of the housings upon the rails being too great for a cross-connecting abutting piece being used from one to the other without great thickness to prevent its breaking, because of the blow being centrally given, the advantages of the mechanism here claimed will be apparent.

It will be suggested that a high blow, unless given at a point forward of the ends of the housings, brings great strain to such ends where they connect with the rails A A, and so with some advantage over striking with the wheels of a car, (though no harm results to the device,) the shoulders c' may be raised high enough to engage directly the platform of the cars at their parts in a line over the rails A A.

The pilot-striker F and cross friction-bar E may be made in one piece, and in this case the dotted lines, at its rear in Fig. 4, would indicate its extensions to pass through housings C. Should the pilot-engager not be used, the bracket shown in Fig. 23 would be used in lieu of brackets shown in Figs. 9 and 10, in supporting sill or coupler engager G. On the pilot-engager the central part, W, is suited to receive the blow from the nose of the pilot of a locomotive, and the height of bed-bars B is such that the housings C may be sent their full throw without the bottom face of pilot bearing upon said bars B, taking the lowest pilot I have yet seen—two and a half inches above top of rails A A.

It will be understood that the device when in its starting position has the ends of housings C beyond the ends of bed-bars B in the opposite direction to pointing of arrow in Fig. 1. The upper friction-bar, D, is made round at its part between the bed-bars B. It takes up less room and prevents its striking wheel M when at its extreme throw.

Having thus described my invention, what I claim as new, and desire to secure by Letters Patent, is—

1. In combination with the rails A A, the housings C, supporting a cross friction-bar, E, said cross friction-bar, and the bed-bars B, and the pilot-engager F, with the supporting-brackets F', substantially as and for the purposes specified.

2. In combination with the rails A A, the housings C, with bosses F''' integral therewith, the pilot-engager F, supported at its rear by the housings C, and at its front by the brackets F', having offsets F'' for engagement with the bosses of the housings and said brackets F', substantially as and for the purposes set forth.

3. In combination, the rails A A, the housings C C and friction-bar D, the bed-bars B, having on their sides ribs h, the pilot-engager F, attached to said housings and having projections g, adapted to engage ribs h on said bars in the operations of the device, substantially as and for the purposes specified.

4. In combination, the rails A A, housings C C, pilot-engager F with projection W, and having longitudinal openings for chain K to pass, said chain K, and attached springs with operative mechanism, substantially as and for the purposes set forth.

5. In combination, in a buffer, the rails A A, housings C C, and sill or coupler engager G, attached thereto through brackets F', and the brace I, and said brackets and brace with the bed-bars B, and the friction-bar D, substantially as and for the purposes set forth.

6. In combination, the rails A A, housings C C, with bosses F''', depending brackets F', with offsets F'', suited to engage said bosses, the sill-engager G with foot G', and lug G'', adapted with a bolt to be held in place to brackets F' or pilot-engager F, and the brace I, fastened to said engager G, substantially as and for the purposes set forth.

7. The combination, in a buffer, of the rails A A, the housings C C, with shoulders C', the sill-engager G, having a bracket or ledge, H, at its rear suited for uniting a brace, the united brace I, having ears I', adapted to fit over housings C and hold them in place, and the brackets F', substantially as and for the purposes set forth.

8. In a buffer, in combination, the rails A A, the housings C C, and brackets F', fastened thereto, the concaved-faced engager G, adapted to engage a hinged coupler Z and close the same and said coupler, substantially as and for the purposes set forth.

9. In combination, the rails A A, the housings C C, with depending brackets F', adapted to support pilot-engager F, said pilot-engager F with central projecting part W adapted to receive the blow from the nose of pilot, the bed-bars B, and friction-bar D, substantially as and for the purposes set forth.

R. P. GARSED.

Witnesses:
H. M. TSCHUDY,
WM. WAGNER, Jr.